United States Patent Office 3,163,530
Patented Dec. 29, 1964

3,163,530
MATERIAL FOR ELECTROPHOTOGRAPHIC
PURPOSES
Heinz Schlesinger, Wiesbaden, Germany, assignor, by mesne assignments, to Azoplate Corporation, Murray Hill, N.J.
No Drawing. Filed Apr. 28, 1960, Ser. No. 25,229
Claims priority, application Germany May 5, 1959
38 Claims. (Cl. 96—1)

Electrophotographic material normally consists of a support on which there is a photoconductive substance, this coating being provided in the absence of light with an electrostatic charge. Then, the material is exposed to light behind a master, or an episcopic image is projected thereon, so that an electrostatic image is formed which corresponds to the master. This image is developed by being briefly contacted with a resin powder, whereupon a visible image is formed which is fixed by heating or by the action of solvents. In this way an image of the master, which is resistant to abrasion, is obtained electrophotographically.

For the photoconductive coatings, inorganic substances such as selenium, sulphur or zinc oxide have been used; organic substances such as anthracene and anthraquinone have also been employed for this purpose.

A material for electrophotographic purposes consisting of a support and a photoconductive coating has now been found in which the photoconductive coating consists wholly or partially of one or more metal salts of 8-hydroxyquinoline, which may have non-ionogenic substituents; the photoconductive coating also may be applied to the supporting material in association with resins.

The base materials used as supports may be any that satisfy the requirements of xerography, e.g. metal or glass plates, paper or plates or foils made of electroconductive resins or plastics, such as polyvinyl alcohol, polyamides, and polyurethanes. Other plastics which have the required electroconductive properties, such as cellulose acetate and cellulose butyrate, especially in a partially saponified form, polyesters, polycarbonates, and polyolefines, if they are covered with an electroconductive layer or if they are converted into electroconductive materials e.g. by chemical treatment or by the introduction of materials which render them electroconductive, may also be used. Generally, electroconductive supports are suitable for the purposes of the present invention. In the sense of the present invention, the term "electroconductive support" comprises materials having a specific conductivity higher than $10^{-12}$ ohm$^{-1}$.cm.$^{-1}$, preferably higher than $10^{-10}$ ohm$^{-1}$.cm.$^{-1}$.

If paper is to be used as supporting material, it is preferably pretreated against the penetration of coating solutions, e.g., it can be treated with a solution of methyl cellulose or polyvinyl alcohol in water or with a solution of an interpolymer of acrylic acid methyl ester and acrylonitrile in a mixture of acetone and methylethylketone, or with solutions of polyamides in aqueous alcohols or with dispersions of such substances.

According to the present invention, the substances used as photoconductive coatings are metal complexes of 8-hydroxyquinoline and its substitution products with non-ionogenic substituents, i.e., compounds of the general formula

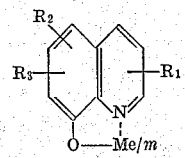

in which $R_1$, $R_2$ and $R_3$ are hydrogen or the same or different non-ionogenic substituents, Me is a metal and $m$ a whole number identical with the valence of the metal. The compounds in which $R_1$ is hydrogen are preferable because of their greater ease of preparation.

Possible substituents are of very varied nature, e.g., halogen, aryl, aralkyl, alkyl, unsaturated alkyl, cycloalkyl, heterocyclic, alkoxy, carbalkoxy, nitro, nitrile, amino and dialkylamino groups, i.e., non-ionogenic substituents which exert no substantial influence on conductivity.

Those such as —COOH, —SO$_3$H and metal salts thereof, or —N$^+$(alkyl)$_3$X$^-$, are excluded, i.e., those having polar, ionogenic character and hence being capable of increasing conductivity considerably, i.e., by more than $10^2$.

Exemplary of the compounds contemplated by the present invention are the following:

FORMULA 1

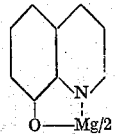

FORMULA 2

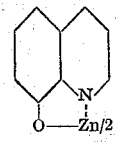

FORMULA 3

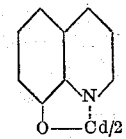

FORMULA 4

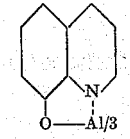

FORMULA 5

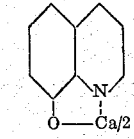

FORMULA 6

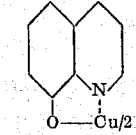

FORMULA 7

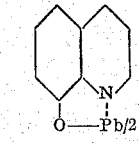

FORMULA 8
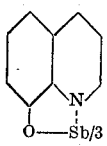

FORMULA 9
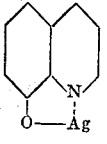

FORMULA 10
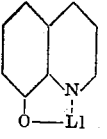

FORMULA 11
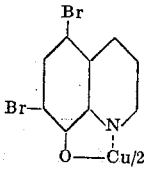

FORMULA 12
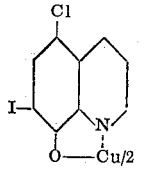

FORMULA 13
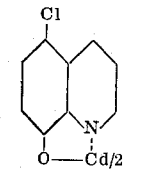

FORMULA 14
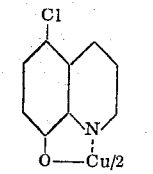

FORMULA 15
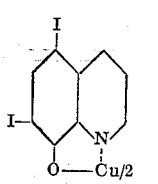

FORMULA 16
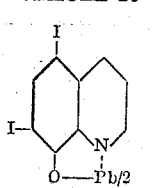

FORMULA 17
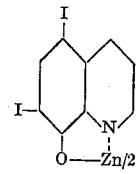

FORMULA 18
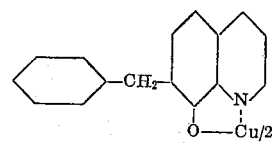

FORMULA 19
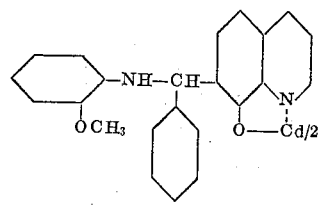

FORMULA 20
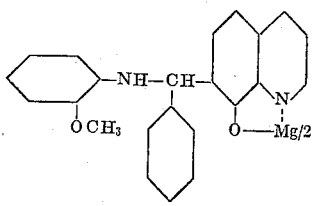

FORMULA 21
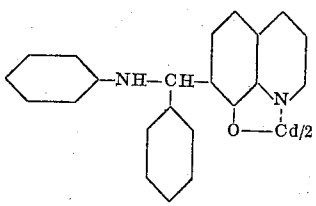

FORMULA 22
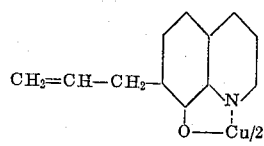

FORMULA 23
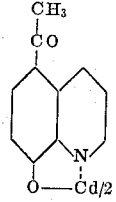

The following table shows the substances on which the metal compounds in the above list of formulae are based and illustrates the photoconductors in question. The individual columns are as follows:

(1) The number under which the constitutional formula of the metal compound appears in the above list.
(2) The 8-hydroxy-quinoline, or substitution product thereof, on which the metal compound is based.
(3) The metal used for the preparation of the metal compound.

(4) Color of the metal compound.

| 1 | 2 | 3 | 4 |
|---|---|---|---|
| 1 | 8-hydroxy-quinoline | Magnesium | Yellow. |
| 2 | do | Zinc | Do. |
| 3 | do | Cadmium | Yellow-brown. |
| 4 | do | Aluminum | Yellow-green. |
| 5 | do | Calcium | Light yellow. |
| 6 | do | Copper | Green. |
| 7 | do | Lead | Yellow. |
| 8 | do | Antimony | Do. |
| 9 | do | Silver | Do. |
| 10 | do | Lithium | Light yellow. |
| 11 | 5,7-dibromo-8-hydroxy-quinoline | Copper | Yellow-green. |
| 12 | 5-chloro-7-iodo-8-hydroxy-quinoline | do | Yellow. |
| 13 | 5-chloro-8-hydroxy-quinoline | Cadmium | Do. |
| 14 | do | Copper | Do. |
| 15 | 5,7-diiodo-8-hydroxy-quinoline | do | Do. |
| 16 | do | Lead | Do. |
| 17 | do | Zinc | Do. |
| 18 | 7-benzyl-8-hydroxy-quinoline | Copper | Green. |
| 19 | 7-(α-(2'-methoxyanilino)-benzyl)-8-hydroxy-quinoline | Cadmium | Yellow. |
| 20 | do | Magnesium | Do. |
| 21 | 7-α-anilino-benzyl-8-hydroxy-quinoline | Cadmium | Do. |
| 22 | 7-allyl-8-hydroxy-quinoline | Copper | Green. |
| 23 | 5-acetyl-8-hydroxy-quinoline | Cadmium | Yellow. |

The preparation of the substances on which the photoconductive compounds are based is by known processes or is analogous to known processes. The conversion to the metal compounds is, in general, a smooth process. For the preparation of these metal compounds solutions of the 8-hydroxyquinolines in an organic, preferably water-miscible, solvent such as acetic acid or lower alcohols, are reacted with an aqueous solution of the metal salt. The reaction product separates out and is isolated by suction filtration and drying.

By choosing a suitable solvent, which is apparent to those skilled in the art, and in some cases by the use of an excess of one component, the compounds in accordance with the invention can be prepared in the manner described above.

For the preparation of the electrophotographic material the photoconductive metal compounds are advantageously suspended in organic solvents such as benzene, acetone, methylene chloride or ethyleneglycol monomethylether or other organic solvents or in mixtures of such solvents, and resins are advantageously added to the suspension. These suspensions are coated upon the supporting material in the normal manner, e.g., by immersion processes, painting or roller application or by spraying. The material is then heated so that the solvent will be removed.

A number of the compounds in question can be applied together to the supporting material or the compounds can be applied in association with other photoconductive substances.

Resins which may be added to the photoconductive coatings include natural resins such as balsam resins, colophony and shellac, synthetic resins such as phenol resins modified with colophony, and other resins in which colophony constitutes the major part, coumarone resins, indene resins and those included under the collective term "synthetic lacquer resins." According to the Saechtling-Zebrowski Plastics Handbook, 11th edition, 1955, page 212 et seq., these include the following; processed natural substances such as cellulose ethers; polymers such as vinyl polymers, e.g., polyvinyl chloride, polyvinylidene chloride, polyvinyl acetate, polyvinyl acetals, polyvinyl ethers, polyacrylic and polymethacrylic acid esters, as also polystyrene and isobutylene and chlorinated rubber; polycondensates, e.g., polyesters, such as phthalate resin, alkyd resin, maleic resinate, maleic acid-colophony mixed esters of higher alcohols, phenol-formaldehyde resins, in particular colophony-modified phenol-formaldehyde condensates, urea-formaldehyde condensates, melamine formaldehyde resins, aldehyde resin, ketone resins, particularly so-called AW2 resins, xylene formaldehyde resins, polyamides, and polyadducts, such as polyurethanes. Also, polyolefins such as various polyethylenes and polypropylenes and phthalic acid polyesters such as terephthalic and isophthalic acid ethyleneglycol polyesters may be used.

If the photoconductive compounds in accordance with the invention are used in association with the resins described above, the proportion of resin to photoconductive substance can vary very greatly but the content of photoconductive substance should be at least 20%. Mixtures of from 2 parts of resin and one part of photoconductive substance to two parts of photoconductive substance to one part of resin are preferred. Mixtures of the two substances in equal parts by weight are particularly favorable.

The light-sensitivity of these photoconductive coatings is primarily in the ultra-violet region. With mercury vapor lamps, which transmit a large amount of ultra-violet rays, relatively short exposure times can be achieved.

The sensitivity of the photoconductive layers in the visible range of the spectrum can be increased by the addition of sensitizers so that the spectral sensitivity is displaced to the visible region and even with ordinary light sources short exposure times can be achieved. Even very small additions, e.g., less than 0.01 percent, have considerable effect. In general, however, the amount of "sensitizer" to be added to the photoconductive substance is from 0.01 to 5 percent, and preferably 0.1 to 3 percent. The addition of larger quantities is possible but in general is not accompanied by any considerable increase in sensitivity.

Suitable sensitizers are constituted in particular by dyestuffs, of which some are listed by way of example below. They are taken from Schultz' "Farbstofftabellen" (7th edition, 1931, 1st vol.):

Triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 863, p. 364) and Fast Acid Eosin G (No. 870, p. 368), as also phthaleins such as Eosin S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); cyanine dyestuffs, e.g., Cyanine (No. 921, p. 394) and chlorophyll.

For the production of copies with the electrocopying material, the photoconductive coating is charged positively or negatively, by means of, for example, a corona discharge with a charging apparatus maintained at about 6000–7000 volts. The electrocopying material is then exposed to light in contact with a master. Alternatively, an episcopic or diascopic image is projected thereon. An electrostatic image corresponding to the master is thus produced on the material. This invisible image is developed by contact with a developer consisting of carrier and toner. The carriers used may be, for example, tiny glass balls, iron powder or tiny plastic balls. The toner consists of a resin-carbon black mixture or a pigmented resin. The toner is generally used in a grain size of about 1 to 100/µ, preferably 5–30/µ. The developer may also consist of a resin or pigment suspended in a non-conductive liquid in which resins may be dissolved. The image that is made visible by development is then fixed, e.g., by heating with an infra-red radiator to 100–170° C., preferably 120–150° C., or by treatment with solvents such as trichloroethylene, carbon tetrachloride or ethyl alcohol, or steam. If a polarity of the electrical charge is used which is opposite to that of the toner contained in the developer, images corresponding to the master, characterized by good contrast effect are obtained. By changing the polarity of the corona discharge it is possible to obtain reversal images with the same master and the same toner.

If transparent supporting material is used, the electrophotographic images can also be used as masters for the production of further copies on any type of light-sensitive sheets.

If translucent supports are used for photoconductive layers such as are provided by the invention, reflex images can be produced also.

The electrophotographic material constituted in accordance with the invention gives images with good contrast; it can be used in particular for the preparation of images with background in various shades of yellow.

The invention will be further illustrated by reference to the following specific examples:

Example I 8 parts by weight of a ketone-aldehyde condensation resin ("Kunstharz AP") are dissolved in 120 parts by volume of benzene. To this solution, 8 parts by weight of the magnesium complex of the 8-hydroxy-quinoline, corresponding to Formula 1, are added and the resulting suspension is finely ground in a ball mill. This suspension is then coated by means of a casting device upon paper, the surface of which has been treated against the penetration of organic solvents, and is then dried. The dry coating is provided with a negative electric charge by corona discharge from a charging device maintained at about 6000 volts and is then exposed under a master to the light of a high-pressure mercury vapor lamp and dusted over with a developer in known manner.

The developer consists of fine glass balls and a very finely divided resin-carbon black mixture. The black pigmented resin adheres to the parts of the coating not struck by light during the exposure and an image corresponding to the master becomes visible. It is slightly heated and thereby fixed.

The developer used above consists of 100 parts by weight of glass balls of a grain size of 350–400μ and 2.5 parts by weight of toner of a grain size of 20–50μ. The toner is prepared from 30 parts by weight of polystyrene (Polystyrol LG), 30 parts by weight of resin-modified maleic acid resin ("Beckacite" K-105) and 3 parts by weight of carbon black ("Peerless Black" 552). These are melted together and the melt is then ground and screened.

For the preparation of the compound corresponding to Formula 1, a solution of 75 parts by weight of 8-hydroxy-quinoline in 1500 parts by volume of ethanol is introduced in a thin stream, with stirring, into a solution, heated to 60–70° C., consisting of 60 parts by weight of $$MgSO_4 \cdot 7H_2O$$

10 parts by weight of ammonium chlorine and 5 parts by volume of concentrated ammonia in 400 parts by volume of water. The reaction product precipitates out and is separated by suction filtration, washed with water and dried.

Example II

The procedure described in Example I is followed but instead of the ketone-aldehyde condensation resin the same quantity of chlorinated polyvinyl chloride ("Rhenoflex") is used, this being dissolved in a mixture of 80 parts by volume of methylethylketone and 40 parts by volume of toluene.

Example III

The coating of paper is carried out as described in Example I and the coating is provided with a positive charge by corona discharge. The image produced on the paper foil after exposure to light under a master is developed as described in Example I by dusting over with a developer, the carrier used being tiny glass balls coated with resin, e.g., coumarone resin ("Cumaronharz 601/90"). A very good image, rich in contrast, corresponding to the master, is obtained.

Example IV 0.5 part by weight of the lithium complex of the 8-hydroxy-quinoline corresponding to Formula 10, and 0.5 part by weight of ketone resin ("Kunstharz EM") are dissolved in 15 parts by volume of ethyleneglycol monomethylether and the solution is applied to an aluminum foil and then dried to form a firmly adherent coating. The preparation of an electrophotographic image is in known manner.

Example V 0.5 part by weight of the aluminum complex of the 8-hydroxy-quinoline corresponding to Formula 4, 0.5 part by weight of ketone resin ("Kunstharz EM") and 0.002 part by weight of Rhodamine B extra (Schultz' "Farbstofftabellen," 7th edition, vol. I, No. 864) in 1 part by volume of methanol are dissolved in 15 parts by volume of chloroform. This solution is coated upon an aluminum foil and dried. Electrophotographic images are produced in the normal manner, but the material is exposed to a 100-watt incandescent lamp instead of to the high-pressure mercury vapor lamp.

Example VI 1 part by weight of chlorinated polyvinyl chloride ("Rhenoflex") is dissolved in a mixture of 10 parts by volume of methylethylketone and 5 parts by volume of toluene. 1 part by weight of the copper complex of the 7-benzyl-8-hydroxy-quinoline corresponding to Formula 18 is added thereto. The suspension is very finely ground and then coated upon paper. The preparation of the electrophotographic image is as described in Example I.

Example VII 8 parts by weight of ketone-aldehyde condensation resin ("Kunstharz AP") are dissolved in 120 parts by volume of benzene. After the addition of 8 parts by weight of the zinc complex of the 8-hydroxy-quinoline corresponding to Formula 2, the resulting suspension is finely ground in a ball mill. Paper which has been treated against the penetration of organic solvents is then mechanically coated with the suspension. Electrophotographic images are then prepared with the coated and dried paper by the process described in Example I. The coating may be charged either positively or negatively.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a dyestuff sensitizer and a compound having the formula

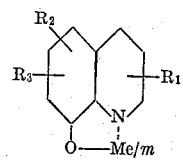

in which $R_1$, $R_2$, and $R_3$ are selected from the group consisting of hydrogen and non-ionogenic substituents, Me is a metal, and $m$ is an integer equivalent to the valence of the metal.

2. An electrophotographic material comprising a conductive support layer and a photoconductive insulating layer, the latter comprising a dyestuff sensitizer and a compound having the formula

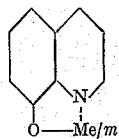

in which Me is a metal and $m$ is an integer equivalent to the valence of the metal.

3. An electrophotographic material comprising a conductive support layer and a photoconducitve insulating layer, the latter comprising a dyestuff sensitizer and a compound having the formula

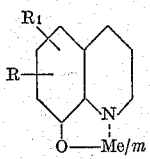

in which R and $R_1$ are halogen, Me is a metal and $m$ is an integer equivalent to the valence of the metal.

4. An electrophotographic material comprising a conductive support layer and a photoconductive insulating layer, the latter comprising a dyestuff sensitizer and a compound having the formula

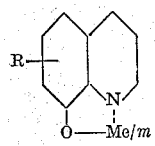

in which R is an aralkyl radical, Me is a metal and $m$ is an integer equivalent to the valence of the metal.

5. An electrophotographic material comprising a conductive support layer and a photoconductive insulating layer, the latter comprising a dyestuff sensitizer and a compound having the formula

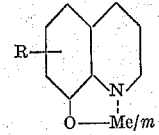

in which R is an alkyl group, Me is a metal and $m$ is an integer equivalent to the valence of the metal.

6. An electrophotographic material comprising a conductive support layer and a photoconductive insulating layer, the latter comprising a dyestuff sensitizer and a compound having the formula

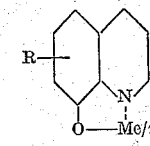

in which R is an alkylene radical, Me is a metal and $m$ is an integer equivalent to the valence of the metal.

7. An electrophotographic material comprising a conductive support layer and a photoconductive insulating layer, the latter comprising a dyestuff sensitizer and a compound having the formula

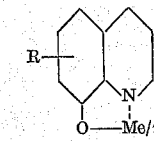

in which R is an acetyl radical, Me is a metal and $m$ is an integer equivalent to the valence of the metal.

8. A photographic reproduction process which comprises exposing an electrostatically charged, supported, photoconductive insulating layer to light under a master and developing the resulting image with an electroscopic material, the photoconductive layer comprising a compound having the formula

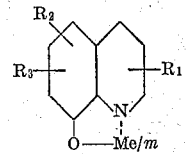

in which $R_1$, $R_2$, and $R_3$ are selected from the group consisting of hydrogen and non-ionogenic substituents, Me is a metal, and $m$ is an integer equivalent to the valence of the metal.

9. A process according to claim 8 in which the photoconductive layer contains a resin.

10. A process according to claim 8 in which the photoconductive layer contains a dyestuff sensitizer.

11. A photographic reproduction process which comprises exposing an electrostatically charged, supported, photoconductive insulating layer to light under a master and developing the resulting image with an electroscopic material, the photoconductive layer comprising a compound having the formula

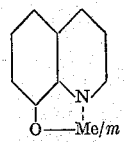

in which Me is a metal and $m$ is an integer equivalent to the valence of the metal.

12. A photographic reproduction process which comprises exposing an electrostatically charged, supported, photoconductive insulating layer to light under a master and developing the resulting image with an electroscopic material, the photoconductive layer comprising a compound having the formula

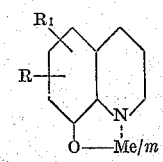

in which R and $R_1$ are halogen, Me is a metal and $m$ is an integer equivalent to the valence of the metal.

13. A photographic reproduction process which comprises exposing an electrostatically charged, supported, photoconductive insulating layer to light under a master and developing the resulting image with an electroscopic material, the photoconductive layer comprising a compound having the formula

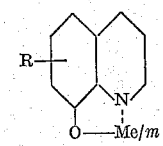

in which R is an aralkyl radical, Me is a metal and $m$ is an integer equivalent to the valence of the metal.

14. A photographic reproduction process which comprises exposing an electrostatically charged, supported, photoconductive insulating layer to light under a master and developing the resulting image with an electroscopic material, the photoconductive layer comprising a compound having the formula

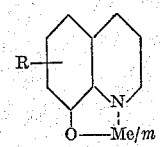

in which R is an alkyl group, Me is a metal and $m$ is an integer equivalent to the valence of the metal.

15. A photographic reproduction process which comprises exposing an electrostatically charged, supported, photoconductive insulating layer to light under a master and developing the resulting image with an electroscopic material, the photoconductive layer comprising a compound having the formula

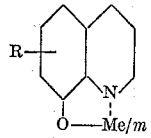

in which R is an alkylene radical, Me is a metal and $m$ is an integer equivalent to the valence of the metal.

16. A photographic reproduction process which comprises exposing an electrostatically charged, supported, photoconductive insulating layer to light under a master and developing the resulting image with an electroscopic material, the photoconductive layer comprising a compound having the formula

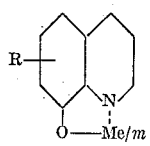

in which R is an acetyl radical, Me is a metal and $m$ is an integer equivalent to the valence of the metal.

17. An electrophotographic material comprising a conductive support layer and a photoconductive insulating layer, the latter comprising a dyestuff sensitizer and a compound having the formula

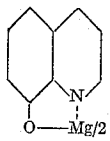

18. An electrophotographic material comprising a conductive support layer and a photoconductive insulating layer, the latter comprising a dyestuff sensitizer and a compound having the formula

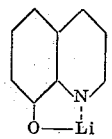

19. An electrophotographic material comprising a conductive support layer and a photoconductive insulating layer, the latter comprising a dyestuff sensitizer and a compound having the formula

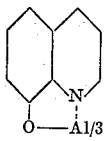

20. An electrophotographic material comprising a conductive support layer and a photoconductive insulating layer, the latter comprising a dyestuff sensitizer and a compound having the formula

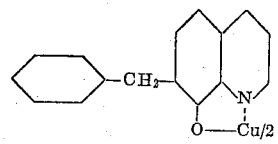

21. An electrophotographic material comprising a conductive support layer and a photoconductive insulating layer, the latter comprising a dyestuff sensitizer and a compound having the formula

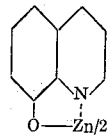

22. A photographic reproduction process which comprises exposing an electrostatically charged, supported, photoconductive insulating layer to light under a master and developing the resulting image with an electroscopic material, the photoconductive layer comprising a compound having the formula

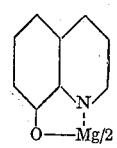

23. A photographic reproduction process which comprises exposing an electrostatically charged, supported, photoconductive insulating layer to light under a master and developing the resulting image with an electroscopic material, the photoconductive layer comprising a compound having the formula

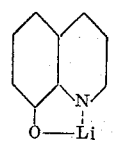

24. A photographic reproduction process which comprises exposing an electrostatically charged, supported, photoconductive insulating layer to light under a master and developing the resulting image with an electroscopic material, the photoconductive layer comprising a compound having the formula

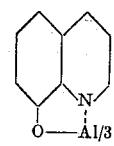

25. A photographic reproduction process which comprises exposing an electrostatically charged, supported, photoconductive insulating layer to light under a master and developing the resulting image with an electroscopic material, the photoconductive layer comprising a compound having the formula

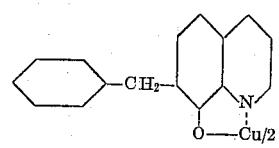

26. A photographic reproduction process which comprises exposing an electrostatically charged, supported, photoconductive insulating layer to light under a master and developing the resulting image with an electroscopic material, the photoconductive layer comprising a compound having the formula

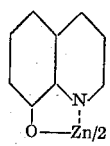

27. An electrophotographic material comprising a conductive support layer and a photoconductive insulating layer, the latter comprising a compound having the formula

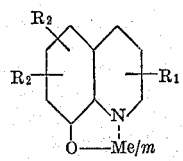

in which $R_1$, $R_2$, and $R_3$ are selected from the group consisting of hydrogen and non-ionogenic substituents, Me is a metal, and $m$ is an integer equivalent to the valence of the metal and a resin present in a range of two parts of resin to one part of photoconductor to two parts of photoconductor to one part of resin.

28. An electrophotographic material comprising a conductive support layer and a photoconductive insulating layer, the latter comprising a compound having the formula

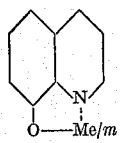

in which Me is a metal and $m$ is an integer equivalent to the valence of the metal and a resin present in a range of two parts of resin to one part of photoconductor to two parts of photoconductor to one part of resin.

29. An electrophotographic material comprising a conductive support layer and a photoconductive insulating layer, the latter comprising a compound having the formula

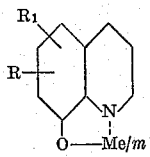

in which R and $R_1$ are halogen, Me is a metal and $m$ is an integer equivalent to the valence of the metal and a resin present in a range of two parts of resin to one part of photoconductor to two parts of photoconductor to one part of resin.

30. An electrophotographic material comprising a conductive support layer and a photoconductive insulating layer, the latter comprising a compound having the formula

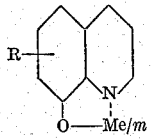

in which R is an aralkyl radical, Me is a metal and $m$ is an integer equivalent to the valence of the metal and a resin present in a range of two parts of resin to one part of photoconductor to two parts of photoconductor to one part of resin.

31. An electrophotographic material comprising a conductive support layer and a photoconductive insulating layer, the latter comprising a compound having the formula

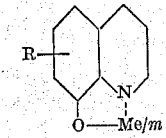

in which R is an alkyl group, Me is a metal and $m$ is an integer equivalent to the valence of the metal and a resin present in a range of two parts of resin to one part of photoconductor to two parts of photoconductor to one part of resin.

32. An electrophotographic material comprising a conductive support layer and a photoconductive insulating layer, the latter comprising a compound having the formula

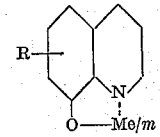

in which R is an alkylene radical, Me is a metal and $m$ is an integer equivalent to the valence of the metal and a resin present in a range of two parts of resin to one part of photoconductor to two parts of photoconductor to one part of resin.

33. An electrophotographic material comprising a conductive support layer and a photoconductive insulating layer, the latter comprising a compound having the formula

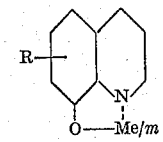

in which R is an acetyl radical, Me is a metal and $m$ is an integer equivalent to the valence of the metal and a resin present in a range of two parts of resin to one part of photoconductor to two parts of photoconductor to one part of resin.

34. An electrophotographic material comprising a conductive support layer and a photoconductive insulating layer, the latter comprising a compound having the formula

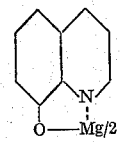

and a resin present in a range of two parts of resin to one part of photoconductor to two parts of photoconductor to one part of resin.

35. An electrophotographic material comprising a conductive support layer and a photoconductive insulating layer, the latter comprising a compound having the formula

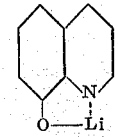

and a resin present in a range of two parts of resin to one part of photoconductor to two parts of photoconductor to one part of resin.

36. An electrophotographic material comprising a conductive support layer and a photoconductive insulating layer, the latter comprising a compound having the formula

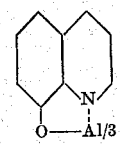

and a resin present in a range of two parts of resin to one part of photoconductor to two parts of photoconductor to one part of resin.

37. An electrophotographic material comprising a conductive support layer and a photoconductive insulating layer, the latter comprising a compound having the formula

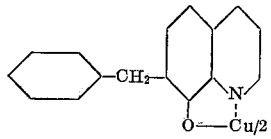

and a resin present in a range of two parts of resin to one part of photoconductor to two parts of photoconductor to one part of resin.

38. An electrophotographic material comprising a conductive support layer and a photoconductive insulating layer, the latter comprising a compound having the formula

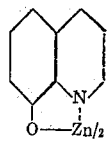

and a resin present in a range of two parts of resin to one part of photoconductor to two parts of photoconductor to one part of resin.

References Cited in the file of this patent
UNITED STATES PATENTS

| | | |
|---|---|---|
| 2,721,824 | Feigin et al. | Oct. 25, 1955 |
| 2,745,832 | Fath et al. | May 15, 1956 |
| 2,755,280 | Feigin et al. | July 17, 1956 |
| 2,876,226 | Schaeffer | Mar. 3, 1959 |
| 2,901,349 | Schaffert et al. | Aug. 25, 1959 |
| 2,903,456 | Schaeffer | Sept. 3, 1959 |
| 2,940,848 | Kostelec et al. | June 14, 1960 |